United States Patent
Bleuer

(10) Patent No.: US 8,636,100 B2
(45) Date of Patent: Jan. 28, 2014

(54) METHOD FOR THE PRODUCTION OF AN OTOPLASTIC DEVICE

(76) Inventor: Beat Bleuer, Stüsslingen (CH)

( * ) Notice: Subject to any disclaimer, the term of this patent is extended or adjusted under 35 U.S.C. 154(b) by 0 days.

(21) Appl. No.: 13/509,248

(22) PCT Filed: May 4, 2009

(86) PCT No.: PCT/IB2009/051805
§ 371 (c)(1),
(2), (4) Date: May 10, 2012

(87) PCT Pub. No.: WO2009/138895
PCT Pub. Date: Nov. 19, 2009

(65) Prior Publication Data
US 2012/0269955 A1    Oct. 25, 2012

(30) Foreign Application Priority Data
May 15, 2008    (CH) ........................................ 0741/08

(51) Int. Cl.
*H04R 25/02* (2006.01)
(52) U.S. Cl.
USPC ............ 181/135; 181/129; 181/130; 381/328
(58) Field of Classification Search
USPC ........... 156/245; 181/129, 130, 135; 381/312, 381/322, 328
See application file for complete search history.

(56) References Cited

U.S. PATENT DOCUMENTS

| | | | |
|---|---|---|---|
| 4,828,777 A | 5/1989 | Birkholz | |
| 5,008,058 A * | 4/1991 | Henneberger et al. | 264/134 |
| 5,146,051 A * | 9/1992 | Hermann | 181/130 |
| 5,531,954 A * | 7/1996 | Heide et al. | 264/496 |
| 6,167,141 A * | 12/2000 | Yoest | 381/322 |
| 6,584,207 B1 * | 6/2003 | Yoest et al. | 381/322 |
| 6,695,943 B2 * | 2/2004 | Juneau et al. | 156/245 |
| 2005/0169491 A1 * | 8/2005 | Pitt et al. | 381/322 |

FOREIGN PATENT DOCUMENTS

EP    0 026 247 B1    12/1984

OTHER PUBLICATIONS

Otoplastic Bleuer & Furst, "International Preliminary Report on Patentability" Int'l Patent Application No. PCT/ IB2009/051805, filed May 4, 2009 (Dec. 6, 2010).

* cited by examiner

*Primary Examiner* — Jeremy Luks
(74) *Attorney, Agent, or Firm* — Janet Sleath; Speckman Law Group PLLC

(57) ABSTRACT

A novel method for producing an otoplastic device is described. In said method, a model of the auditory canal of an individual is made, then a thin film is placed over the model, and said thin film is used for making an accurate copy of the model in a deep drawing process.

10 Claims, 1 Drawing Sheet

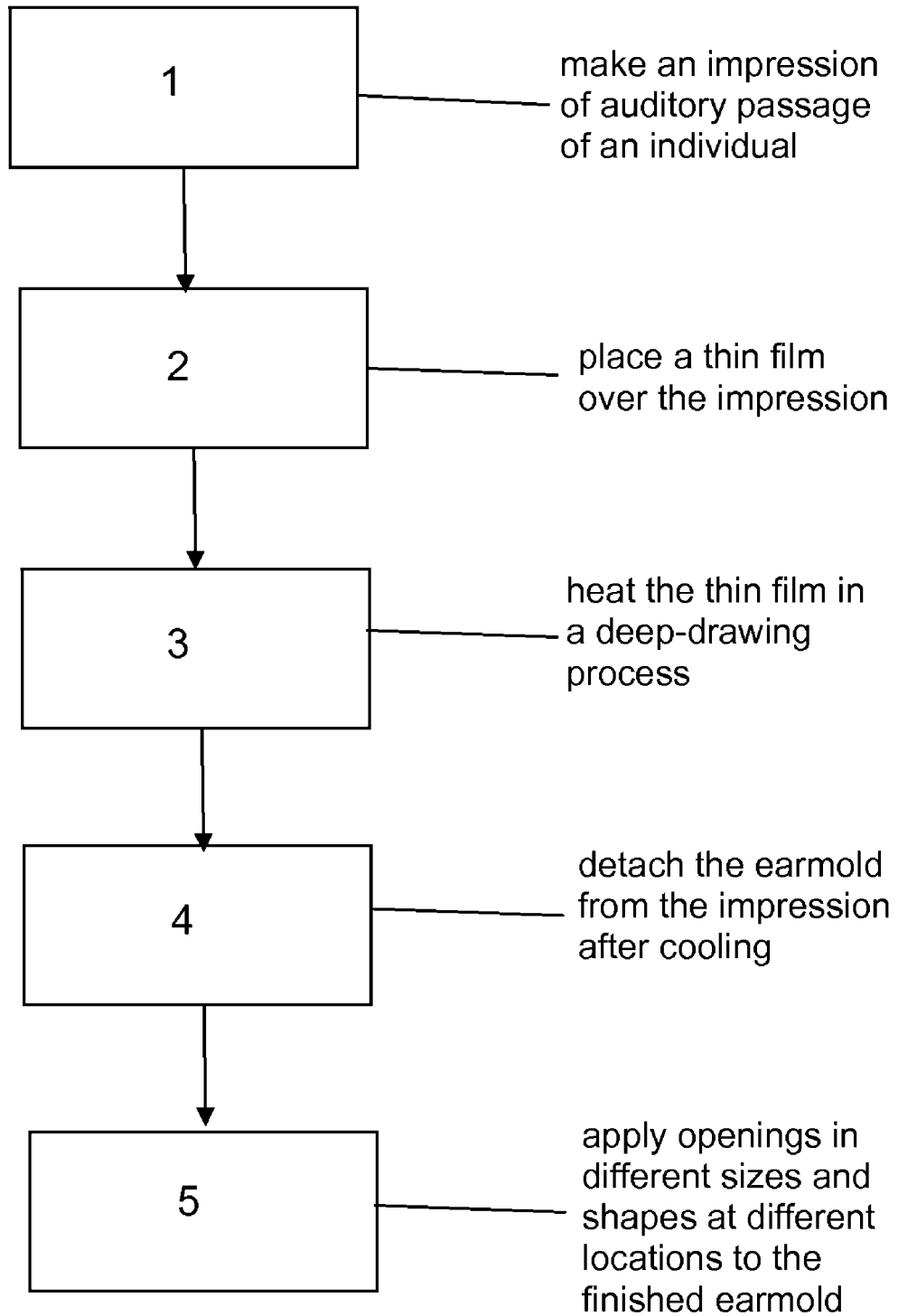

METHOD FOR THE PRODUCTION OF AN OTOPLASTIC DEVICE

REFERENCE TO RELATED APPLICATIONS

This application is the US national phase entry of International Patent Application no. PCT/IB2009/051805, filed May 4, 2009, which claims priority to Swiss patent application no. 00741/08, filed May 15, 2008.

1. Field of the Invention

The invention relates to an earmold according to the preamble of claim 1 and a method for its production according to the preamble of claim 4.

2. Description of the Prior Art

An earmold relates to the production of an individual custom-fit earpiece as a hearing aid or earplug for example by the hearing-aid acoustician. The term will be used both for the production process and also for the finished product.

Since the shape of the ear and the auditory passage differs from person to person, an impression of the ear forms the basis for the earmold. An individually produced small cotton sheath or foam ball (a so-called tamponade) is introduced on a fine string up to the bony part of the external auditory passage after an otoscopic examination and cleaning of the ear by a hearing-aid acoustician. It is used as a protection for the eardrum in order to prevent that soft impression compound will flow even deeper into the auditory passage, touch the eardrum and possibly injure it.

After that, the auditory passage and the areas of the ear required for the earmold to be produced will be impressed with the help of an impression syringe and addition-curing silicone material which consists of two components. This material will cure in a few minutes and form a positive impression of the ear. This impression will be removed carefully and is used as a model for the earmold maker for the production of the earmold.

The further progress of the production can occur by scanning the ear impression with a 3D scanner. The virtual earmold will be processed on the computer and "printed" thereafter on a 3D printer, which will stack a plurality of extremely thin plastic layers one above the other and will allow the stack to cure under UV light until the earmold is finished. This process is used nearly exclusively today for the production of shells for in-the-ear hearing-aid systems or for behind-the-ear hearing-aid systems.

The above production by means of a 3D scanner and extremely thin plastic layers is very laborious and expensive, and therefore makes a hearing aid adapted with an individual earmold more expensive.

EP-A-0026247 further describes a method for producing an earpiece. An impression of the auditory passage is made of a rubber-like material. Thereafter, a thin film made of polycarbonate resin with a thickness of 0.060 mm is clamped in a frame 19 and heated with a heating device 25 for a period of approximately 3 minutes. The frame 19 is then moved down, so that the film is placed over the impression of the auditory passage. The film will be pulled tightly over the impression by negative pressure. Thereafter, the impression will be pressed out of the film, so that a hollow press mold is obtained. This press mold is then filled with a self-curing acrylic resin. A piece of wire and a tube are then pressed vertically into the acrylic resin until they reach the base of the press mold. The press mold is then held in a warm glycerin bath at body temperature. Once the molding made of acrylic resin has cured, it will be removed manually from the press mold. The earpiece thus obtained is massive (see page 8, line 10 to page 9, line 30). Consequently, the film described here is merely used as an auxiliary means for producing the earpiece.

OBJECT OF THE INVENTION

It is the object of the present invention to provide an earmold which can be carried in a tissue-friendly and pressure-free manner in the ear, and further a simple and cost-effective production method for such an earmold.

SUBJECT MATTER OF THE INVENTION

This object is achieved by an earmold which is produced by means of an impression of the auditory passage of an individual, characterized in that a thin film is placed over the impression and the earmold is identically reproduced in a deep-drawing process.

The earmold in accordance with the invention is made of plastic material. The production method in accordance with the invention can be performed in an especially simple way by means of a conventional deep-drawing device which is used by a dental technician for example. The production method in accordance with the invention allows further producing an earmold which is qualitatively at least as good as the one produced by previously known methods.

BRIEF DESCRIPTION OF THE DRAWING

FIG. 1 shows the method for producing an earmold as described herein.

DESCRIPTION OF AN EMBODIMENT OF THE INVENTION

Further advantages of the invention are obtained by employing a film having an en wall thickness of 1 to 3 mm and/or a film consisting of polypropylene, polyethylene or polycarbonate, and are taught by the description below, in which the invention will be explained in closer detail by reference to an embodiment and with reference to the drawing in FIG. 1.

As in the known method, an impression of the auditory passage of the individual is produced at first by the hearing-aid acoustician (step 1), which impression consists of a material which is suitable on the one hand for simple removal from the auditory passage and on the other hand for deep-drawing. Thereafter, said impression is place on the base plate of a deep-drawing device, so that as little undercut as possible is produced during deep drawing. Especially the deep-drawing device called "Druformat" (Dreve Dentamid GmbH, D-59423 Unna) has proven its usefulness, which is usually used by dental technicians. Thereafter, a plastic film made of copolyester, polypropylene (PP), polyethylene (PE), ethylene vinyl acetate, a copolymeride made of ethyl vinyl acetate, polycarbonate (PC) or polyvinyl ether enterephthalate with a constant wall thickness of 0.5 to 3.5 mm, preferably 1.0 mm, is placed on the impression (step 2) and heated in the deep-drawing device (step 3 ), and pulled over the impression in this manner. After cooling the earmold produce in this way, is detached from the impression (step 4 ) and processed with conventional materials in the desired shape. An earmold is obtained from the impression which offers a precise reproduction. Depending on the size of the deep-drawing device, several impressions can be covered with a film in one working process and therefore several earmolds can be produced. Openings in different sizes, shapes and random places can be provided in the earmold which is arranged as a film (step 5).

The earmold can also be provided with a pull-out aid in order to introduce the earmold simply into the auditory passage and to remove it therefrom. The readily produced earmold can subsequently be covered with additional material in order to achieve better adherence in the auditory passage.

The individually adapted earmold which is produced as a film is tissue-friendly, pressure-free and can be combined with any system in the area of hearing aids.

The invention claimed is:

1. An earmold made of plastic, wherein the earmold is a custom-fit earpiece and is produced by:
    (a) providing an impression of the auditory passage of an individual, wherein the impression consists of a material which is suitable for simple removal from the auditory passage;
    (b) placing the impression on a base plate of a deep-drawing device;
    (c) placing a thin film over the impression and heating the thin film in a deep-drawing process, thereby forming the earmold as a precise reproduction of the auditory passage; and
    (d) detaching the earmold as a finished product from the impression after cooling, wherein the earmold is arranged as a thin film of even wall thickness.

2. The earmold of claim 1, wherein the film has a wall thickness of 1 to 3 mm.

3. The earmold of claim 2, wherein the film consists of polypropylene, polyethylene or polycarbonate.

4. A method for producing an earmold, wherein the earmold is a custom-fit earpiece, the method comprising:
    (a) providing an impression of the auditory passage of an individual, wherein the impression consists of a material which is suitable for simple removal from the auditory passage;
    (b) placing the impression on a base plate of a deep drawing device;
    (c) placing a thin film over the impression and heating the film in a deep-drawing process, thereby forming the earmold as a precise reproduction of the auditory passage; and
    (d) detaching the earmold as a finished product from the impression after cooling.

5. The method according to claim 4, wherein the earmold is processed with conventional materials in the desired shape.

6. The method according to claim 4, wherein openings in different sizes and shapes are applied at different locations to the earmold which is arranged as a film.

7. The method according to claim 4, wherein the earmold is provided with a pull-out aid.

8. The method according to claim 4, wherein the finished earmold is coated with an additional material in order to achieve better adhesion in the auditory passage.

9. The method according to claim 4, wherein the film has an even wall thickness of 1 to 3 mm.

10. The method according to claim 4, wherein the film consists of polypropylene, polyethylene or polycarbonate.

* * * * *